US008110231B2

(12) United States Patent
Coleman et al.

(10) Patent No.: US 8,110,231 B2
(45) Date of Patent: Feb. 7, 2012

(54) METHODS FOR MAKING IMPROVED TEXTURE CEREAL BARS (75) Inventors: Edward C. Coleman, New Fairfield, CT (US); Sharon R. Birney, Yorktown Heights, NY (US); Robert E. Altomare, Braircliff Manor, NY (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1240 days.

(21) Appl. No.: 11/279,165

(22) Filed: Apr. 10, 2006

(65) Prior Publication Data

US 2007/0237880 A1 Oct. 11, 2007

(51) Int. Cl.
A23L 1/164 (2006.01)

(52) U.S. Cl. .......... 426/96; 426/453; 426/454; 426/465; 426/468; 426/512; 426/618; 426/620

(58) Field of Classification Search .................. None
See application file for complete search history.

(56) References Cited

U.S. PATENT DOCUMENTS

| | | | |
|---|---|---|---|
| 3,821,443 A | 6/1974 | Halladay et al. |
| 3,882,253 A | 5/1975 | Schafer et al. |
| 3,903,308 A | 9/1975 | Ode |
| 4,017,644 A | 4/1977 | Jokay |
| 4,018,900 A | 4/1977 | Hayward et al. |
| 4,018,901 A | 4/1977 | Hayward et al. |
| 4,038,423 A | 7/1977 | Hayward et al. |
| 4,039,688 A | 8/1977 | Hayward et al. |
| 4,049,832 A | 9/1977 | Hayward et al. |
| 4,055,669 A | 10/1977 | Kelly et al. |
| 4,145,448 A | 3/1979 | Hayward et al. |
| 4,152,462 A | 5/1979 | Hayward et al. |
| 4,152,463 A | 5/1979 | Hayward et al. |
| D257,093 S | 9/1980 | Brittner |
| 4,310,560 A | 1/1982 | Doster et al. |
| 4,451,488 A | 5/1984 | Cook et al. |
| 4,496,606 A | 1/1985 | Michnowski |
| 4,543,262 A | 9/1985 | Michnowski |
| H70 H | 6/1986 | Berkowitz et al. |
| 4,605,561 A | 8/1986 | Lang |
| 5,045,328 A | 9/1991 | Lewis et al. |
| 5,137,745 A | 8/1992 | Zukerman et al. |
| 5,534,275 A | 7/1996 | Humbert et al. |
| 5,866,189 A | 2/1999 | Garwood et al. |
| 5,922,388 A | 7/1999 | Garwood et al. |
| 6,168,820 B1 | 1/2001 | Garwood et al. |
| 6,299,929 B1 | 10/2001 | Jones |

(Continued)

FOREIGN PATENT DOCUMENTS

EP 0293552 12/1988

(Continued)

*Primary Examiner* — Lien Tran
(74) *Attorney, Agent, or Firm* — Fitch, Even, Tabin & Flannery LLP (57) ABSTRACT

A method of producing a cereal bar is provided in which the cereal comprises a cereal mixture including ready-to-eat (RTE) cereal pieces joined together with a binder, where the cereal and binder together form a cereal matrix which is heated for a time and temperature to reduce the water activity of the external portion thereof while maintaining an internal portion of the cereal matrix at a higher second water activity. The method provides cereal bars requiring less compressive force to be formed into a cohesive self-supporting structure in providing a chewy reduced-density cereal bar with improved shelf life.

19 Claims, 3 Drawing Sheets

U.S. PATENT DOCUMENTS

| | | | |
|---|---|---|---|
| 6,303,163 | B1 | 10/2001 | Wu |
| 6,375,998 | B1 | 4/2002 | Wu |
| D458,728 | S | 6/2002 | Funk et al. |
| D460,240 | S | 7/2002 | Froseth et al. |
| 6,432,457 | B1 | 8/2002 | Jones |
| D462,501 | S | 9/2002 | Allen et al. |
| D465,636 | S | 11/2002 | Allen et al. |
| 6,481,999 | B2 | 11/2002 | Knost |
| D469,593 | S | 2/2003 | Funk et al. |
| 6,585,999 | B1 | 7/2003 | King et al. |
| 6,592,915 | B1 | 7/2003 | Froseth et al. |
| D478,703 | S | 8/2003 | Allen et al. |
| D478,704 | S | 8/2003 | Funk et al. |
| 6,607,760 | B2 | 8/2003 | Burri et al. |
| 6,630,178 | B1 | 10/2003 | Hoie |
| 6,642,259 | B1 | 11/2003 | Meydani et al. |
| 6,667,063 | B2 | 12/2003 | Crum |
| 6,676,982 | B2 | 1/2004 | Mody |
| 6,720,015 | B2 | 4/2004 | Prosise et al. |
| 6,723,357 | B1 | 4/2004 | Shifferaw et al. |
| 6,723,358 | B1 | 4/2004 | van Lengerich |
| 6,743,770 | B2 | 6/2004 | Bell et al. |
| 6,746,707 | B2 * | 6/2004 | Krysiak et al. ............... 426/620 |
| 6,749,885 | B2 | 6/2004 | Cahill, Jr. et al. |
| 6,749,886 | B2 | 6/2004 | Jones |
| 6,767,570 | B2 | 7/2004 | Zukerman et al. |
| 6,773,734 | B2 | 8/2004 | Sirohi et al. |
| D495,851 | S | 9/2004 | Funk et al. |
| 6,790,466 | B1 | 9/2004 | Rabault et al. |
| 6,800,310 | B2 * | 10/2004 | Squire et al. ............... 426/96 |
| D498,897 | S | 11/2004 | Milker et al. |
| 6,821,537 | B2 | 11/2004 | Wu |
| 2002/0058089 | A1 | 5/2002 | Burri et al. |
| 2003/0091697 | A1 | 5/2003 | Froseth et al. |
| 2003/0124200 | A1 | 7/2003 | Stone |
| 2003/0134010 | A1 | 7/2003 | Krysiak et al. |
| 2003/0147939 | A1 | 8/2003 | King et al. |
| 2003/0152642 | A1 | 8/2003 | Stone |
| 2003/0157223 | A1 | 8/2003 | Sirohi et al. |
| 2003/0161914 | A1 | 8/2003 | Sault et al. |
| 2003/0185961 | A1 | 10/2003 | Sault et al. |
| 2003/0190355 | A1 | 10/2003 | Hermelin et al. |
| 2003/0215559 | A1 | 11/2003 | Mikaelian et al. |
| 2003/0228395 | A1 | 12/2003 | Garti et al. |
| 2004/0009284 | A1 | 1/2004 | Boice et al. |
| 2004/0013771 | A1 | 1/2004 | Funk et al. |
| 2004/0022901 | A1 | 2/2004 | Funk |
| 2004/0023889 | A1 | 2/2004 | Gardiner et al. |
| 2004/0037905 | A1 | 2/2004 | Bringe |
| 2004/0043128 | A1 | 3/2004 | Duffy et al. |
| 2004/0062802 | A1 | 4/2004 | Hermelin |
| 2004/0071855 | A1 | 4/2004 | Wassenaar |
| 2004/0081715 | A1 | 4/2004 | Schmitz et al. |
| 2004/0086600 | A1 | 5/2004 | Rapp et al. |
| 2004/0096479 | A1 | 5/2004 | Levine |
| 2004/0101595 | A1 | 5/2004 | Lines et al. |
| 2004/0121045 | A1 | 6/2004 | Engelson et al. |
| 2004/0126461 | A1 | 7/2004 | Lines et al. |
| 2004/0126477 | A1 | 7/2004 | Coleman et al. |
| 2004/0161422 | A1 | 8/2004 | Ranganathan |
| 2004/0166142 | A1 | 8/2004 | Chevaux et al. |
| 2004/0166203 | A1 | 8/2004 | Gautam et al. |
| 2004/0170645 | A1 | 9/2004 | Daniels |
| 2004/0170743 | A1 | 9/2004 | Akashe et al. |
| 2004/0185087 | A1 | 9/2004 | Hartle et al. |
| 2004/0185158 | A1 | 9/2004 | McHugh et al. |
| 2004/0253295 | A1 | 12/2004 | Martin et al. |
| 2004/0253296 | A1 | 12/2004 | Martin et al. |
| 2004/0253347 | A1 | 12/2004 | Gaonkar et al. |
| 2004/0258711 | A1 | 12/2004 | Shastri et al. |
| 2004/0258829 | A1 | 12/2004 | Zheng et al. |
| 2005/0002989 | A1 | 1/2005 | Palmer et al. |
| 2005/0019475 | A1 | 1/2005 | Plank et al. |
| 2005/0027005 | A1 | 2/2005 | Boldt |
| 2005/0037127 | A1 | 2/2005 | Sault et al. |
| 2005/0048182 | A1 | 3/2005 | King et al. |
| 2005/0053695 | A1 | 3/2005 | Coleman et al. |
| 2005/0069625 | A1 | 3/2005 | Chimel et al. |

FOREIGN PATENT DOCUMENTS

| | | |
|---|---|---|
| EP | 0861603 | 9/1998 |
| EP | 1151676 A1 | 11/2001 |
| EP | 1285590 | 2/2003 |
| EP | 1302111 | 4/2003 |
| EP | 1346640 | 9/2003 |
| EP | 0818956 B1 | 10/2003 |
| EP | 0871375 | 2/2004 |
| EP | 1386545 | 2/2004 |
| EP | 0877563 | 3/2004 |
| EP | 1402785 | 3/2004 |
| EP | 1402786 | 3/2004 |
| EP | 1402787 | 3/2004 |
| EP | 1164870 B1 | 5/2004 |
| EP | 1425978 | 6/2004 |
| EP | 1178732 | 3/2005 |
| EP | 1512325 | 3/2005 |
| EP | 1518464 | 3/2005 |
| JP | 2001352927 | 12/2001 |
| WO | 9507631 | 3/1995 |
| WO | 9522908 | 8/1995 |
| WO | 9725879 | 7/1997 |
| WO | 9853704 | 12/1998 |
| WO | 9905920 | 2/1999 |
| WO | 0122835 | 4/2001 |
| WO | 0149131 | 7/2001 |
| WO | 0149132 | 7/2001 |
| WO | 03061406 | 7/2003 |
| WO | 03068000 | 8/2003 |
| WO | 03082026 | 10/2003 |
| WO | 03088989 | 10/2003 |
| WO | 03090555 | 11/2003 |
| WO | 03094634 | 11/2003 |
| WO | 03105606 | 12/2003 |
| WO | 2004002423 | 1/2004 |
| WO | 2004004485 | 1/2004 |
| WO | 2004004686 | 1/2004 |
| WO | 2004017742 | 3/2004 |
| WO | 2004037015 | 5/2004 |
| WO | 2004037018 | 5/2004 |
| WO | 2004052900 | 6/2004 |
| WO | 2004056207 | 7/2004 |
| WO | 2004066955 | 8/2004 |
| WO | 2004073421 | 9/2004 |
| WO | 2004082402 | 9/2004 |

* cited by examiner

METHODS FOR MAKING IMPROVED TEXTURE CEREAL BARS

FIELD OF THE INVENTION

This invention relates to methods for making cereal bars, and more particularly methods for making a cereal bar comprising ready-to-eat (RTE) cereal pieces joined together with a binder in forming a cereal matrix structure that is heat treated in a manner that improves bar cohesion such that reduced compressive force is needed to consolidate the bar, providing a light, chewy food product with suitable shelf life.

BACKGROUND OF THE INVENTION

Various types of hand-held cereal bars are known, as well as methods for their manufacture. For instance, cereal bars are known containing cereal dry mix ingredients which are held together by a binder system. Typical binder systems may contain corn syrups and other ingredients (i.e., sugar, fibers, etc). The binder system is commonly heated before it is added to the cereal mix to assist blending. The cereal/binder matrix has been sheeted or molded to form a layer before cooling and cutting steps. Normally, to achieve the required cohesion, the cereal matrix is compressed under rollers or other conventional cereal bar making equipment to form the bars.

The prior methods for making cereal bars have used significant compression during forming in order to deliver a bar with the required cohesion to hold together and provide a self-supporting cereal matrix. However, the amount of compression force used in the past has inordinately increased the bar density, and fractured cereal pieces at the surface thereof. The resulting cereal bar products had diminished quality texture and chewiness.

Methods are needed for making cereal bars which allow reductions in the compressive force required to form the bars while ensuring that adequate bar cohesion and desirable product texture is provided.

SUMMARY OF THE INVENTION

This invention relates to a method for making chewy, reduced-density cereal bars having improved texture and shelf life in which a heat step is applied to a shaped cereal matrix that selectively reduces moisture content in surface regions of the bar relative to the central core region thereof, prior to cooling, cutting or other finishing steps. Upon storage, the water activities of the heat-set cereal bar equilibrate to provide a chewy, moist texture throughout the entire bar. It has been discovered that the inclusion of the heat step in the method improves bar cohesion such that less compressive force is required during forming to consolidate the bar into a self-supporting structure, thereby allowing for lower density, improved texture food bars to be obtained.

In one embodiment, a method is provided for making cereal bars, comprising forming a cereal matrix comprising cereal pieces and an edible binder in a wt:wt ratio of about 2:1 to about 1:2, respectively, into a cereal matrix layer having an exposed external portion and an internal central portion, wherein the external portion and internal portion each has an initial water activity exceeding about 0.4. In one particular embodiment, the cereal matrix layer is a unitary bar-shaped mass. Then, the cereal matrix layer is heated for a time and temperature effective to reduce water activity to less than about 0.3 in the external portion of the cereal matrix layer, while maintaining the internal central portion of the cereal matrix layer at a water activity greater than about 0.40, to provide a heated layer. The heated cereal matrix layer is cooled. Preferably the heat set cereal matrix layer or bar is rested in an unheated chamber of the oven for several minutes, and then rapidly cooled. The cooled layer, or alternatively the cereal matrix layer prior to the heat-set step, can be cut into discrete cereal bars. After the heat treatment and cooling, the moisture content of the discrete cereal bars is allowed to equilibrate such that each of the external surface portion and the interior central portion has a water activity of about 0.3 to about 0.7.

The inventive method for making cereal bars including the heat-set step provides cohesive high quality, lower density cereal bars that can be made with less compression, and which have superior shelf life, piece integrity and texture. Also, lighter, less dense cereal bars can be made in accordance with methods of the present invention with lower proportions of cereal pieces relative to binder. Also, when heat set according to the methods of this invention, less binder may penetrate and become absorbed by the cereal pieces as compared to cereal bars made without the heat treatment. The cereal bar develops increased chewiness over time and the shelf life is extended. The quality of the finished food bar is thus improved. Additionally, less milk solids are needed in the cereal matrix formulation to assist shelf life, which reduces costs. Also, addition amounts of humectants such as sugar alcohols can be reduced while still providing desirable long-lasting product chewiness. A wide range of food bar products can be prepared by the method of the invention including sweet and savory food bars.

DETAILED DESCRIPTION OF THE PREFERRED EMBODIMENTS

Figure 1:
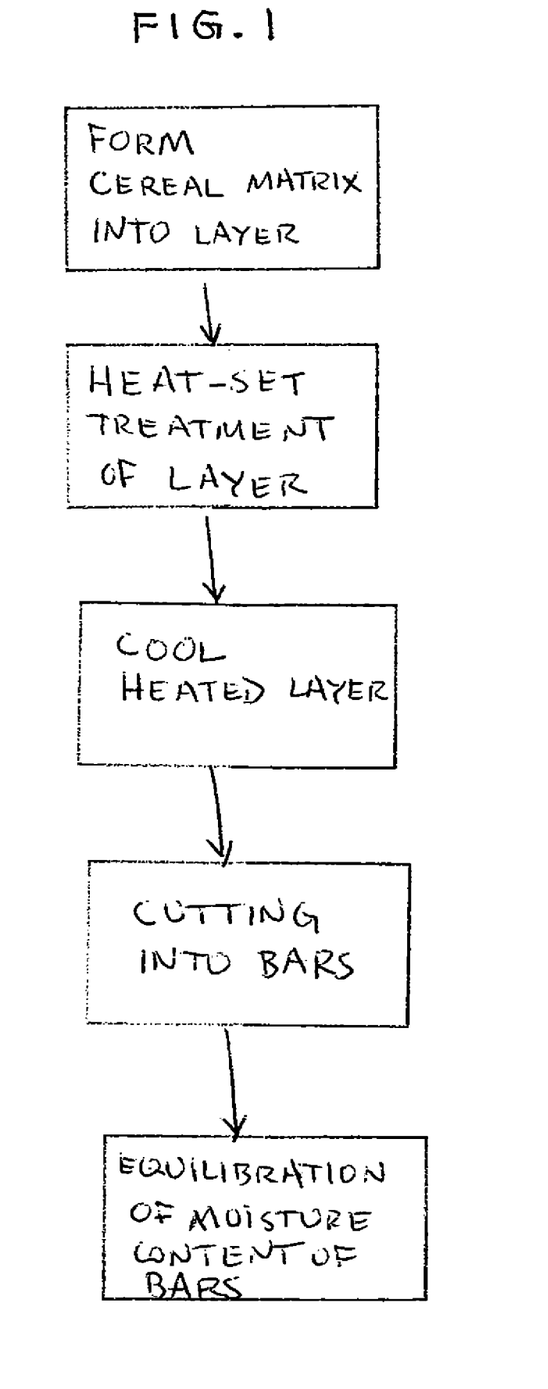
FIG. 1 is a flow chart showing a method of the present invention.

Referring to FIG. 1, the present invention relates to a method for making improved texture cereal bars comprising steps of forming a cereal matrix into a layer, heat-setting the cereal matrix layer effective to reduce its surface moisture content relative to its central core portion, cooling the heat-treated layer, cutting the layer into discrete bars after cooling (or alternatively before heat-setting), and allowing the moisture content in the finished cereal bars to equilibrate.

The inclusion of the heat-set treatment creates a cereal bar with improved cohesion, with minimal or no compression required, thus maintaining cereal piece integrity, and providing a lower density, low water activity cereal bar, with a reasonable shelf life. The present invention makes it possible to significantly reduce the amount of compression otherwise required during cereal bar forming. It has been discovered that exposing the cereal matrix layer to a heat-set step effective to reduce the water activity of the surface portion of the layer to less than about 0.30 while maintaining the central portion of the layer at a water activity of at least about 0.40, delivers a bar having excellent cohesion and superior piece integrity. The heat treatment is applied in manner such that the external surface portion of the cereal matrix layer is preferentially heated while the internal core temperature remains relatively cooler in comparison such that the heat-set step selectively and mainly removes moisture from, and thus reduces water activity in, the surface portion and not the interior central or core portion of the bar. For purposes herein, water activity measurements are performed such that the "surface portion" of the cereal bar refers to the exposed outer surface of the bar, and the "central portion" or 'core portion" refers to the geometric center of the bar mass.

In addition, after allowing the cereal bars to equilibrate under normal storage conditions at ambient conditions for 1-3 months, it has been observed that cereal bars equilibrate yielding a uniform chewy and moist texture through shelf life. The equilibrated cereal bars can have a water activity of about 0.4 to about 0.6. Therefore, methods of this invention make it possible to reduce or minimize compression and compaction forces applied during forming to provide lighter, less dense chewy product bars which have adequate structural cohesion and lower overall water activity. Also, lighter, less dense cereal bars can be made in accordance with methods of the present invention with lower proportions of cereal pieces relative to binder. Further illustrative details about the heat-set treatment and other processing steps of the inventive method are provided below.

Cereal Matrix. The cereal matrix contains a mixture of ready-to-eat ("RTE") cereal pieces and a binder system to hold it together. The binder system includes binder that can be heated to a flowable or molten condition such that it can be more easily coated upon the surfaces of the cereal pieces, and upon cooling solidifies and reverts to a non-flowable condition to bond the cereal pieces together. For purposes herein, it will be appreciated that the binder system also may include non-binding ingredients which can be conveniently introduced into the cereal matrix via a binder-based composition. The cereal matrix may comprise cereal pieces and edible binder in a wt:wt ratio of about 2:1 to about 1:2, particularly about 1.5:0.5 to about 0.5:1.5, and more particularly about 1.2:0.8 to about 0.8:1.2, respectively.

Cereal Pieces. The ready-to-eat (RTE) cereal pieces may comprise any known or suitable RTE cereal pieces. Oat, wheat, rice, and corn cereals, singly or in combinations thereof, may be used. In general, the RTE cereal pieces may be of any types such as rolled, puffed, flaked, shredded, granola, and other conventional or useful varieties. Puffed varieties may be oven-puffed, gun-puffed, extruded gun-puffed, and the like. Flaked cereals may be directly made from grains or grain parts, or extruded types thereof. Granola cereals are ready-to-eat cereals prepared by taking conventional whole-rolled or quick-cooking oats and mixing them with other ingredients, such as nut pieces, coconut, brown sugar, homey, malt extract, dried milk, dried fruits, dried and infused fruit, water, cinnamon, nutmeg, and vegetable oil, etc. The admixture of granola ingredients typically is spread in a uniform layer onto a band of a continuous dryer or oven, and the toasted layer is then broken into chunks. Commercially available cereal pieces include, for example, Post® Grape-Nuts®, Post® Toasties® Corn Flakes, Post® Honey Bunches of Oats®, Post® Raisin Bran®, Post® Bran Flakes®, Post® Selects®, Post® Carb Well®, Post® Cocoa Pebbles®, Post® Golden Crisp®, Post® Alpha Bits®, Kelloggs® Rice Krispies®, General Mills Wheaties®, General Mills Cheerios®, and the like, individually or in any combinations thereof. The RTE cereal used in the present invention is not, however, limited to commercially available cereals. Extruded pieces containing protein and fiber may also be utilized. The RTE cereal may be introduced to the cereal matrix formulation as whole or crushed pieces, or a combination thereof. Preferably, a majority of the cereal pieces are whole pieces. Different types of cereal pieces may be used in combination. They also may be used in combination with granola pieces, fruits, nuts, inclusions, etc. Different types of cereal pieces may be obtained as unused product from cereal production and packaging lines, increasing the overall efficiency of food production. The cereal pieces generally, but not exclusively, have a bulk density ranging from about 0.05 to 0.5 g/cc, and each weigh about 0.2-10 g. Pre-crushed cereal pieces may generally have a particle size of greater than about 30 U.S. mesh (+0.595 mm) and less than about 6 U.S. mesh (−3.36 mm).

Binder System. The binder system may be composed exclusively of binder material(s) or may be binder(s) combined with non-binding ingredients. The term "binder," when used without qualification herein generally refers to an edible binding composition that can be conveniently rendered flowable via heating, and reverts to non-flowable condition upon cooling, that essentially acts as a "glue" for combining the dries, that is, the relatively dry ingredients of the cereal matrix such as the cereal pieces, or other food components under discussion herein.

Binder Material. The binder system preferably contains a major amount (>50 to 100%) of binder material and a minor amount (0 to <50%) of non-binding materials. Enough binder should be used such that cereal pieces can be interconnected and bound together as a unitary structure by the binder. The binder system preferably comprises a carbohydrate-based binder. The carbohydrate-based binder may comprise a carbohydrate syrup composition, such as, for example, one or more of corn syrup, high fructose corn syrup, rice syrup, brown rice syrup, liquid sucrose, evaporated cane juice, molasses, honey, caramel, compound coating and the like. In this way, the binder system includes binding materials that also lend sweetening flavor to the cereal mixture. In one embodiment, about 25 wt. % to about 45 wt. % of the total weight of the cereal matrix is made up of carbohydrate based syrup as the primary or essentially sole binder material. Other binding materials may include sugar alcohols, gelatin, hydrolyzed collagen, egg solids, fructooligosaccharides, additional soluble fibers, chocolate liquor, maltodextrin and the like and combinations thereof. Farinaceous powders, such as dry starch powders, also may be used at least in part as the binder material. The syrup composition also may be a gelatin matrix comprised of gelatin, water, fat, syrup and sugars. When mixed with other ingredients, such as soy products, the binder can also be a source of protein. Polyhydric alcohols, i.e., sugar alcohols, also may be included in the binder system. Sugar alcohols include, e.g., glycerin, maltitol, sorbitol, erythritol, and xylitol, and the like and combinations thereof). Sugar alcohols also may be used as sugar-free sweeteners and/or humectants. As another advantage of the present invention, the amounts of sugar alcohols or other edible polyhydric alcohols used can be reduced or eliminated as the cereal bars processed according to the present invention have improved chewiness and cohesion by inclusion of the heat-set step. For instance, the cereal bar formula may contain 0 to 10 wt % sugar alcohols.

As indicated, the binder can also be used as a medium for admixture and a carrier for distributing additives throughout the cereal matrix, including, for example, liquid-soluble or liquid-dispersible food bar additives such as processing aids, functional additives, vitamins, minerals and macronutrients, flavorings and colorings, and so forth. These additional additives also may be premixed in part or wholly with the cereal pieces, or alternatively may be added separately to the cereal matrix formula. The cereal matrix, which is considered herein as comprising the RTE cereal pieces and binder system, generally comprises about 10 to about 60 wt % RTE cereal pieces, and about 30 to about 60 wt % binder system.

Fat Source. For instance, a fat source may be included in the cereal matrix for various purposes. The term "fat source" as used herein is synonymous with the term "lipid." Fat sources may serve as binders, shelf life extenders, flavorants, combinations of these purposes, and so forth. Fat sources also can form a surface barrier film on the cereal pieces to retard binder penetration into the cereal pieces. The cereal matrix may generally contain about 0 to about 15 wt % total fat source content.

Suitable sources of the fat source include vegetable, dairy, animal and/or marine fat sources. Useful herein are fats and oils that are conventionally used in food products, particularly confections. Fatty triglycerides such as oils and solid fats can be used herein as well as blends thereof. Particularly useful oils include, for example, nonhydrogenated and/or partially hydrogenated oils such as palm kernel oil, palm oil, canola oil, corn oil, safflower oil, soybean oil, coconut oil, cottonseed oil, olive oil, and fractionated oils such as fractionated palm kernel oil. Oils having a melting point above room temperature generally are more convenient to process with. However, butter, shortening, or other solid fats at room temperature also may be used, but typically will require heating sufficient to make them flowable and dispersible during processing. As dairy fat sources, anhydrous milkfat, milk concentrate, or powdered milk may be used. The fat source also includes flavoring components such as chocolate, cocoa butter, and coconut, and the like and combinations thereof. Animal (e.g., lard, beef tallow) and marine (e.g., fish oil) fat sources are generally less desired, but also may be used. Partially digestible and non-digestible synthesized triglycerides or natural lipids also optionally may be used.

Other Additives. Other food-flavoring additives also may be included in the binder system or are otherwise added to the cereal matrix formula, such as, for example, salt, spices, herbs, vanilla, cocoa, chocolate, cinnamon, cheese solids, fruit particles, nuts, seeds, candies, coconut, and so forth. Other additives also may be included in the cereal mixture, such as stabilizers, preservatives, dietary fiber sources, sweeteners, nutrients, antioxidants, excipients, and so forth. Such additives may be included to the extent they do not introduce objectionable flavors or adversely impact the texture or water activity properties or processability of the cereal bar. Generally, such additives are added at levels of less than about 5 percent of the cereal bar matrix.

For example, dairy solids may be includes in minor amounts to enhance shelf life. Dairy solids such as non-fat dry milk may be included in the cereal matrix formula in amounts of about 0.1 to about 10 wt %. Soy lecithin may be included to adjust the texture and consistency of the cereal matrix. Excipients such as calcium carbonate may be used. Preservatives may be included, such as sorbates, benzoates, etc. Natural and/or artificial sweeteners may be added. The sweetener preferably is a carbohydrate-based sweetening material including mono-, di-, and polysaccharides and their derivatives. Suitable sweeteners include, for example, corn syrup, corn syrup solids, corn sweetener, sucrose, fructose, honey, molasses, malt syrups, starches, lactose, dextrose, maltose, maltodextrins, individually or in any combinations thereof. Artificial sweeteners may be selected, for example, from aspartame, saccharin, sucralose, acesulfame K, and the like and combinations thereof. Dietary fiber sources can be included, such as water-soluble and insoluble dietary fibers selected from one or more of oligosaccharides, psyllium, beta glucan, oat bran, oat groat, pectin, carrageenan, guar, locust bean gum, gum acacia, and xanthan gum, and the like or combinations thereof.

Flavorings can include nuts, nut pieces, fresh fruits, dried fruits, fruit products, seeds, candies, marshmallows, chocolates and chocolate products, and so forth. Flavorings further include any fruit flavors such as berry flavors, apple, cherry, plum, raisin, banana, pear, peach, figs, dates and so on. Flavorings may also include fats, salts, honeys, cheeses, frosting, powdered food products, sugar, sugar substitutes, gelatins and spices. Flavorings may also include colorings as well as any nut flavors as well as any sweet flavors such as chocolate, vanilla, peanut butter, caramel, butterscotch, lemon, malt, cinnamon, graham, coconut flavors, mint and so on. Flavorings additionally include any savory flavors such as all dairy, smoke, pepper, spicy and vegetable flavors.

Colorants include natural or uncertified colors from natural sources or certified colors for the effect of color. In one embodiment, the colors include dyes, certified aluminum lakes or colors derived from a natural source. Coloring agents may also be water-based or oil-based or dry. Coloring agents may be primary colors, blends of colors or discrete mixtures of colors, such as confetti.

Other edible additives include fortification components and the like. Vitamins, minerals, antioxidants, amino acids, essential oils, herbals, and polyphenols are non-limiting examples of the fortification component. The preferred vitamins are for example, vitamin A, vitamin C, vitamin D, vitamin E, vitamin K, and their derivatives and/or pro-vitamins. Preferred vitamins also include B vitamins such as, for example, biotin, folic acid, niacin, niacinamide, pantothenate, pyridoxine hydrochloride, riboflavin, thiamin hydrochloride, and the like. The minerals may include but are not limited to bromine, calcium, chromium, copper, iodine, iron, magnesium, manganese, phosphates, phosphorus, potassium, selenium, sodium, sulfur, and zinc. Amino acids include, for example, arginine, histidine, isoleucine, leucine, lysine, methionine, phenylalanine, threonine, tryptophan, valine, alanine, aspartic acid, glutamic acid, glutamine, glycine, serine, tyrosine, creatine, and the like. Moreover, phytochemicals, sterols, lycopine, herbal supplements such as ginseng, guarana, yerba mate, and the like may be included.

Inclusions may be included to provide a crunchy textural feel. The inclusions have at least one physiologically functional component and may be, for example, fat-based inclusions, carbohydrate-based inclusions, protein based inclusions, and the like. The fat-based inclusions are characterized by having fat as the continuous phase. Non-limiting examples of fat-based inclusions include, chocolate, peanut butter, fat substitutes, and the like. Preferred fat-based inclusions are chocolate chips, peanut butter chips, and combinations thereof. Non-limiting examples include, whey protein, soy protein, milk protein, egg protein, peanut flour, nut meats, vegetable protein, casein, and combinations thereof. Examples of carbohydrate inclusions include, starch, sugar, gels, and combinations thereof. Moreover, the carbohydrate-based inclusions are preferably, panned inclusions, extruded gel pieces, friable carbohydrate pieces, sugar bits, extruded grain flour pieces and combinations thereof. The inclusions maybe, for example, agglomerates, capsules, compilations of ingredients, chunks, bits, drops, strands, strings, and the like, and may be different from one another. That is, it is not necessary that the inclusions be the same. For example, the food bar optionally may contain inclusions that are fat-based inclusions and inclusions that are carbohydrate-based inclusions. The food bars of the present invention also may be formulated to deliver high protein content and/or high fiber content per serving.

In order to render the binder system flowable, it may be pre-heated, preferably before combination with the cereal pieces, to about 120° F. to about 230° F., or other temperature suitable to render the binder flowable. Once the binder is combined with the cereal mixture, the combination may be blended together to disperse the binder and the cereal mixture to form a substantially uniform mixture. The resulting cereal matrix is then subsequently formed or shaped into single layer sheets of substantially uniform thickness.

Forming. During the forming step, the cereal matrix is formed or shaped into a layer having a cross-sectional shape that generally corresponds to a desired bar shape. The forming step typically involves application of compressive force to a cereal matrix mass sufficient to compact the mass into a cohesive structure that will hold its shape upon cooling of the binder. Forming preferably is conducted before the binder in the cereal matrix has fully cooled back into a solid or rigid state while the cereal matrix is still readily deformable without embrittlement.

The bars may be formed by conventional methods including sheet forming and extrusion methods. They also may be poured into a pan and pressed with a platen. They also may be poured into a mold or former. Sheeting is preferred in the practice of the present invention. The mixed cereal and binder ingredients may be formed into sheets through standard roller presses used for this general purpose. Conventional sheeting apparatus may be used, such as those generally comprising one or more pairs of counter-rotating compression rollers or belts. As indicated, the compression pressures needed to provide a cereal matrix layer that can be rendered cohesive in the finished cereal bar are effectively reduced due to the heat setting procedure, described in more detail below, implemented between the compression and cooling steps. Increased compression increases final bar density, as it reduces the amount and degree of voids and channels. Lighter, less dense bars generally are preferred by consumers from a texture standpoint. Therefore, it is desirable to minimize compression to as little compacting force as necessary to provide a cohesive self-supporting structure.

The suitable compressive pressure values used for forming can vary depending on the particular cereal bar formulation being processed. Enough force is applied so the cereal pieces remain intact without being crushed during bar compaction. That is, preferably all whole cereal pieces present in the bar visually remain uncrushed or essentially uncrushed. Generally, but not exclusively, the compressive forces applied during sheeting do not exceed about 3500 g/cm$^2$ (50 psi), and may range from about 700 to about 3500 g/cm$^2$ (10 to about 50 psi), particularly less than about 1750 g/cm$^2$ (25 psi). In extrusion the ingredients may be transferred to a conventional confectionery bar extruder having roller bars which force the mixture through a die to form a generally rectangular-shaped extrudate, rope, or other convenient shape, which can be cut into appropriate sized cereal bar pieces.

Heat-Set Step. Once the cereal matrix has been formed into a single layer sheet, the sheet is exposed to a heat step before or after cutting the sheet into bars, preferably the sheet is heated first and then cooled and cut into bar shapes. As indicated, the heat set procedure makes it possible to reduce the compressive force applied during the prior forming operation to obtain a sufficiently cohesive bar. The heat treatment step may comprise heating the single layer cereal sheet for about 1 to 20 minutes at a temperature of from about 200° F. to about 450° F., as measured in oven air space at a location approximately one inch (2.5 cm) from the external portion of the layer.

Prior to the heat-set step, the cereal matrix generally has an initial water activity of about 0.5 to about 0.6. Upon heating the cereal sheet, the external layer or surface of the cereal matrix will have a reduced water activity, typically less than about 0.30, which yields a crispy outside texture. The interior central portion of the cereal matrix is usually maintained at a higher water activity level than the external portion of the cereal matrix such that the water activity is not significantly reduced and may be substantially the same as the initial water activity of the entire cereal matrix, since it is not in direct contact with oven heating components or heated air in the oven during the relatively short dwell times used in the oven for the heat-set step. After heating, over time the cereal bar will equilibrate yielding a substantially uniform water activity and moist texture throughout the bar. As the bar is kept at ambient conditions, the final water activity of the bar is about 0.4 to about 0.6, particularly about 0.40 to about 0.55, throughout the bar after the heat-set and cooled layer is allowed to equilibrate for about 1 to about 3 months at ambient temperature conditions.

Since the heating step is important in reducing the external water activity of the cereal bar, the type of oven used may have an impact on the overall effectiveness of this heat-set step. Preferably, an indirect-fired oven is used such that the combustion from the burner system does not come into contact with the product. In other words, there is no convection in the oven. An example of an indirect-fired oven is a Werner and Pfleiderer oven, which has two burners and oven zones. In these ovens, heated air from the burner is circulated through the ducts above and below the oven band such that the ducts radiate energy. Since there is no forced convection, air temperatures in the oven stratify. A typical feature of an indirect-fired oven is that the temperatures near the product are much lower than the set point. Upon exiting the non-heated second stage of two stage indirect oven, the heated layer generally has a temperature of about 24-38° C. (about 75 to 100° F.). Based on experiments conducted, it has been observed that raising the temperature set point has two principal effects: more heat was moves to the front of the oven, and the oven band heats for a longer time and reaches higher temperatures. In a preferred manner of operating the indirect oven, an indirect oven having two burners and oven zones is used. The first burner zone is heated while the second is not. The residence or dwell time of the matrix layer in each oven zone is dictated by the type of oven used. For indirect-fired ovens, it may be at least about 2.5 minutes, particularly about 5-10 minutes. If the second burner in the second oven zone is on, the oven band tends to heat up too much, creating issues with cooling in that carbohydrate binder syrup may flow in the oven and can pool a bit at the bottom of the bar.

Although indirect-fired ovens are preferred, impingement ovens, radiant heat ovens, and microwave ovens also may be used to practice the heat-set step. They also are operated in a manner that selectively heats and de-moisturizes the external portion of the cereal matrix layer more intensely and rapidly than the core region thereof. The residence or dwell time of the matrix layer in an impingement oven may be, for example, at least about 0.8 minutes, and range between about 0.8 to 1.2 minutes.

Cooling. The heated layer is placed within or passes through a cooling means to lower the bar temperature sufficient to solidify binder. The cooler may be a cooling tunnel, which is maintained at a temperature of about 0 to 27° C. (about 32 to 80° F.), through which the heated layer can be continuously conveyed. In a preferred embodiment, the heated layer is conveyed through a tunnel cooler at a temperature and at a rate allowing the bar to cool to at least room temperature. The heated layers also can be chilled batchwise in a freezer or refrigerator. It also can be allowed to stand at room temperature conditions until it cools. As another cooling option, cryogenic cooling may also be utilized.

Cutting. After the sheeted or extruded layer of cereal matrix is heat set and cooled, it then is cut into the final desired discrete bar or piece sizes. The cereal matrix layers can be cut by any conventional or suitable means useful for such purposes, e.g., slitters, guillotines, and so forth. Ultrasonic cutters could also be used.

The cereal bar may be cut into any suitable shape, size and thickness. It may have a regular or irregular geometric shape. Regular geometric shapes include, for example, rectangular, square, circular, or oval cross-sections. The cutting operating may comprises conventional slitting methods for forming ribbons in the machine direction and cross-cutting them in the cross-machine direction to form discrete pieces or bars. For example, the cooled layer may be passed through slitters where it is slit or cut into individual pieces. Any suitable type of slitter can be used. In one embodiment, the slitter is comprised of any number of rotating blades. The sheet layer can be cut into any suitable number of strips.

In one embodiment, after the heat-set step and cooling, the sheet layer is cut into a plurality of strips that can be any suitable width, such as from about 1.5 to 6 cm, and cross-cut into bars or pieces that are about 3 to 15 cm in length. The thickness of the finished bar that may be manufactured using the method of the invention is not particularly limited. For hand held food bar products, the bars or pieces may have a thickness, for example, of about 0.5 cm to about 5 cm, and length and width dimensions convenient for grasping. The bulk density of the finished bar also may vary depending on the composition. In general, a bulk density of about 0.05 to 0.5 g/cc may be provided. A moisture content of less than about 15% generally is provided. Although not limited thereto, the finished cereal bars may be cut into sizes having a weight of about 10 g to about 80 g.

The cereal bar also optionally may be manufactured to include a continuous milk filling layer, a topping layer, or a coating, such as, for example, the types illustrated in WO 01/22835, which descriptions are incorporated herein by reference. For example, a compound coating may be used for drizzling or enrobing the cereal matrix which contains a binder, such as those previously described herein, as well as flavoring materials (chocolate, cocoa powder, vanilla, etc.), stabilizers (e.g., lecithin), sweeteners (e.g., natural and/or artificial sugars), inclusions, and so forth. Other additives and processing aids commonly used in confectionery compound coatings also may be used. Ingredients such as compound coating and caramel can also be put into binder system.

The cereal bars may be packaged in any suitable manner. In one embodiment, the bars may be individually wrapped such as in conventional flexible metallized film known in the art and used for this general purpose. The individually wrapped bars may be packaged in a secondary container, or a plurality of wrapped bars may be packaged in a common secondary container or carton.

When heat set according to the methods of this invention, it also is thought that less binder penetrates and becomes absorbed by the cereal pieces as compared to cereal bars made without the heat treatment. The quality of the finished food bar is thus improved. The bar processed in this manner develops increased chewiness over time and the shelf life is extended. Also, less milk solids are needed in the cereal matrix formulation to assist shelf life, which reduces costs. Superior piece integrity/texture through shelf life and lower density bars are important advantages of this invention.

A wide range of food bar products can be prepared by the methods of the invention including sweet food bars and savory food bars.

The examples that follow are intended to further illustrate, and not limit, embodiments in accordance with the invention. All percentages, ratios, parts, and amounts used and described herein are by weight unless indicated otherwise.

EXAMPLES

Example 1

A binder and cereal mixture were prepared by mixing the binder mixture and cereal ingredients of the "strawberry formula" indicated in Table 1, thus forming a cereal matrix. All non-cereal ingredients were added via the binder mixture. The cereal pieces and total binder were used in a weight:weight ratio of about 1:1, respectively.

TABLE 1

|  | Percent |
| --- | --- |
| Cereal Ingredients |  |
| Corn Flakes Cereal | 12.0 |
| Strawberry Pieces | 10.0 |
| Toasted Oats | 10.0 |
| Crisp Rice | 7.0 |
| Grape Nuts Cereal | 4.0 |
| Grape Nut Fines | 4.0 |
| Cereal flakes | 3.0 |
| Granola | 4.0 |
| Binder Mixture Ingredients |  |
| Corn Syrup | 31.4 |
| Glycerin | 3.0 |
| Sugar | 3.0 |
| Vegetable Oil | 2.0 |
| Calcium Carbonate | 2.0 |
| Honey | 2.0 |
| Flavor | 1.0 |
| Salt | 0.2 |
| Nonfat Dry Milk | 1.0 |
| Lecithin | 0.2 |
| Citric Acid | 0.1 |
| Vitamins | 0.1 |

The binder mixture was heated to about 170° F. and minimally mixed with the cereal mixture. The temperature of the cereal matrix after mixing with the binder was about 100° F. to about 110° F. The cereal matrix was then sheeted into a single layer of thickness 0.75 inch. Rollers were used for sheeting and the compressive pressure was just enough to ensure cereal pieces were not crushed. The cereal bar matrix contained all visual, intact cereal pieces which were quite visible. Prior to baking, the surface portion and central of the sheeted single layer prior to baking each had an initial water activity exceeding about 0.35. The surface portion of the sheeted layer had a water activity of 0.52, and the central portion had a water activity of 0.50, as measured by AquaLab Water Activity Meter Series 3 TE. The sheeted single layer was then baked in a gas-fired two-zone indirect oven (Werner and Pfleiderer) at about 325° F. to about 400° F. for about 10 to about 15 minutes, until the desired texture was obtained. The first oven zone was heated and the second oven zone was turned off (unheated). The baked sheeted single layer had a surface water activity of approximately 0.30 and the central water activity was approximately 0.52. The sheeted single layer was then cooled in a cooling tunnel, and cut into discrete bars of length 3.5 inches, width 1.5 inch, and height 1.0 inch.

Example 2

Figure 2:
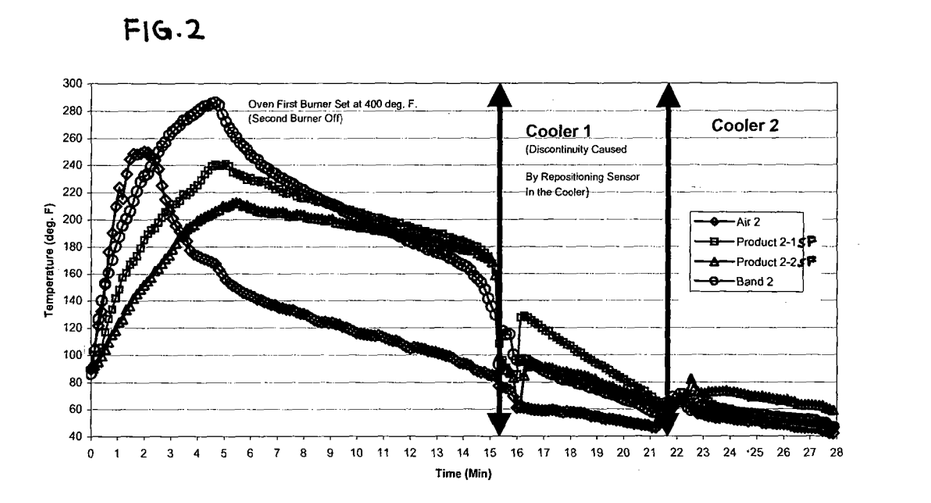
FIG. 2 is a graph showing oven temperature conditions for a strawberry cereal bar formulation described in the examples below.

Cereal bars, designated 2-1 SF and 2-2 SF, were prepared having the same strawberry formula and admixture method of Example 1, which were heat-set in a two-zone indirect gas-fired oven (Werner and Pfleiderer) with an overall retention time in the bake chamber of 15 minutes. The first oven zone was heated and the second oven zone was turned off (unheated). Prior to baking, the surface portion of the sheeted layer had a water activity of 0.54, and the central portion had a water activity of 0.52. Heat was applied for 7.5 minutes in the first oven zone, and 7.5 minutes were available for oven temperatures to cool slowly in the second unheated oven zone. The oven set point was 400° F., and the line speed was about 7 feet per minute. The surface temperature of the cereal bar was measured via a thermocouple placed in the oven space approximately 1 inch from the top surface of the bar. The center portion temperature of the bar product was measured via a thermocouple placed at it geometric center. The band temperature also was measured. The oven and cooler profile temperature measurements are shown in FIG. 2. The baked sheeted single layer had a surface water activity of approximately 0.30 and the central water activity was approximately 0.54. This profile allowed the product to set on the surfaces while the center remained moist and chewy.

Example 3

Cereal bars having a "honey nut" formula as described in Table 2 below, and separately the strawberry formula of Example 1, were prepared and were heat-set in the two-zone indirect fired oven under the conditions described in Example 2. For the honey nut formula, the cereal pieces and total binder were used in a weight:weight ratio of about 1:1, respectively. All non-cereal ingredients were added via the binder mixture. Prior to baking, the surface portions of the honey nut formula sheeted layers had a water activity of about 0.52, and the central portions had a water activity of about 0.54. The strawberry formula bar had surface and central water activities similar to the bars described in Example 1. Temperature measurements were taken during the oven treatment of the bars at an air temperature oven setting of 400° F.

TABLE 2

|  | Percent |
|---|---|
| Honey Nut Cereal Ingredients | |
| Toasted Oats | 15.0 |
| Cereal Flakes | 4.0 |
| Corn Flakes Cereal | 14.4 |
| Wheat Flakes | 5.0 |
| Crisp Rice | 11.0 |
| Grape Nut Fines | 4.0 |
| Granola | 4.0 |
| Binder Mixture Ingredients | |
| High Maltose Corn Syrup | 17.0 |
| High Fructose Corn Syrup | 6.0 |

TABLE 2-continued

|  | Percent |
|---|---|
| Corn syrup | 5.0 |
| Maltodextrin | 3.0 |
| Glycerin | 3.0 |
| Soybean oil | 2.0 |
| Calcium Carbonate | 3.0 |
| Non fat dry milk | 1.0 |
| Vitamin/mineral premix | 0.1 |
| Salt | 0.2 |
| Citric acid | 0.1 |
| Lecithin | 0.2 |
| Honey | 1.5 |
| Flavor | 0.5 |

Figure 3:
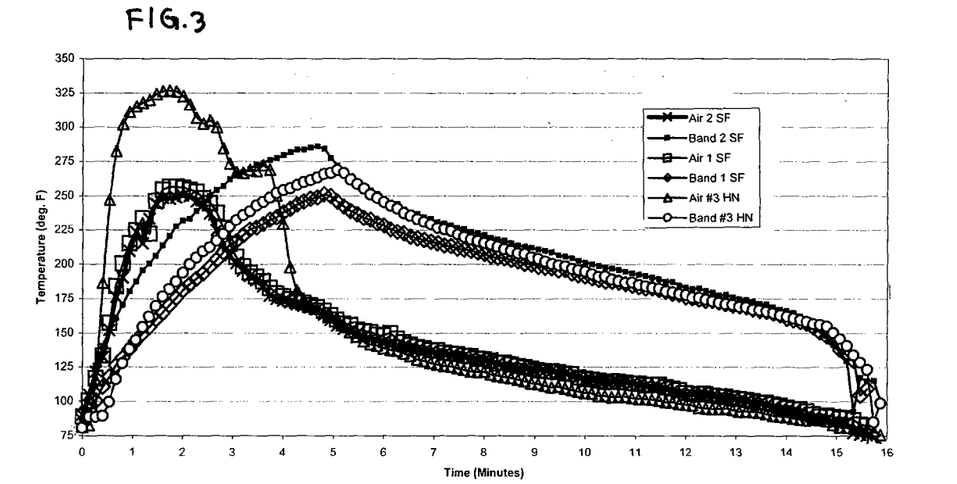
FIG. 3 is a graph showing oven temperature conditions for strawberry and honey nut cereal bar formulations described in the examples below.

The temperature of the air surface near the bar surface and band was measured. The air probe for the honey nut formula bars was estimated to be located 3 inches above the band which supports and transports the bars through the oven during heating. The air probe for the strawberry formula bars was located 1.5 inches above the band. The oven and cooler profile temperature measurements are shown in FIG. 3 in which "HN" refers to measurements related to processing of a honey nut bar formulation, and "Air 1 SF", "Air 2 SF", "Band 1 SF" and "Band 2 SF" correspond to measurements related to processing of first and second strawberry formula bars.

Figure 4:
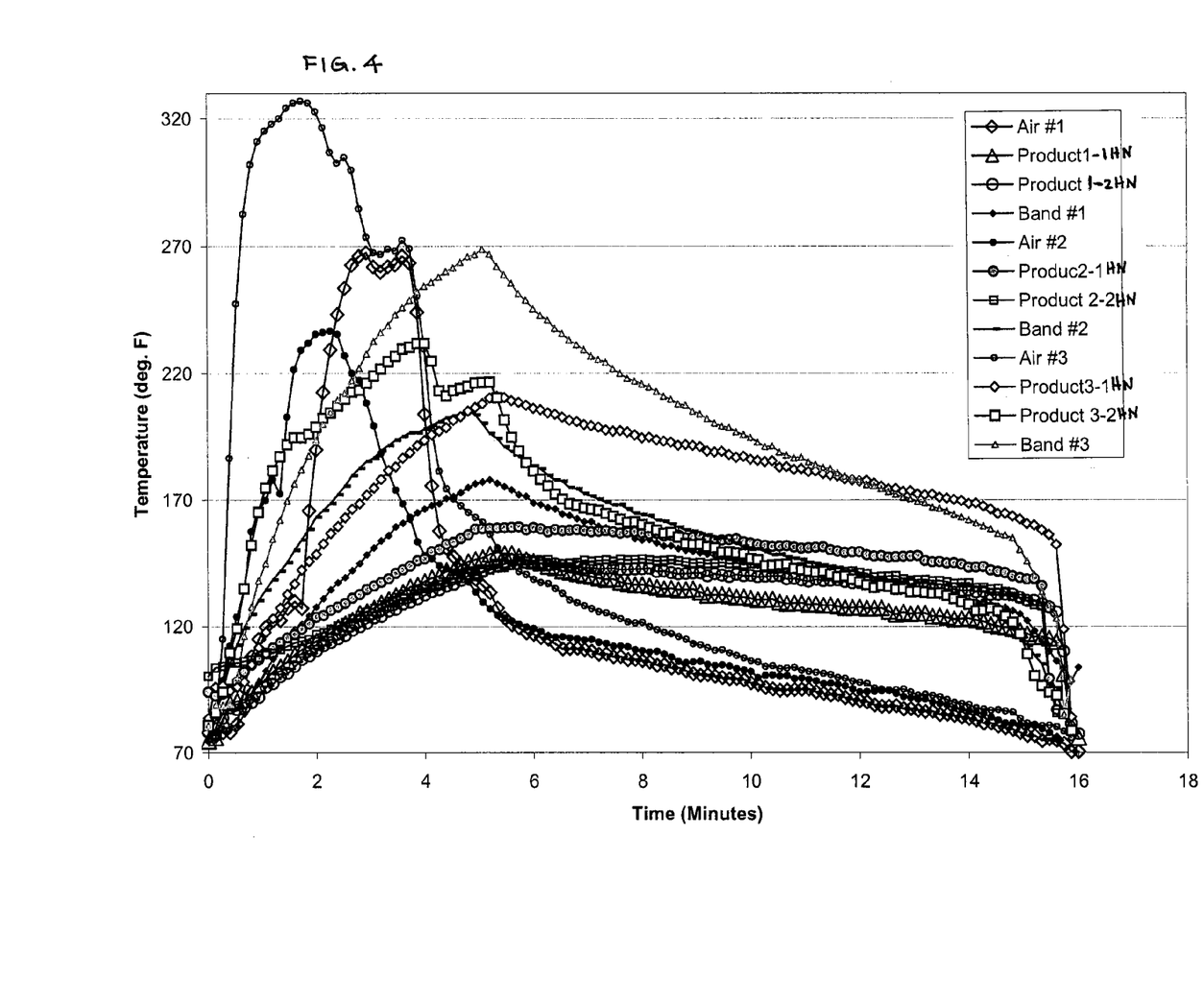
FIG. 4 is a graph showing cereal bar and oven temperature conditions for honey nut cereal bar formulations at three different oven setting temperatures as described in the examples below.

The effect of oven set point was also investigated. Additional runs for the honey nut bar formulations as described in Table 2 were conducted at first zone, oven set point, air temperatures of 250, 325 and 400° F. in the indirect fired oven. Two separate bars were processed at each oven temperature setting. The results are shown in FIG. 4, in which air and band #1 and products 1-1 HN and 1-2 HN refer to results for honey nut bar processing at 250° F.; air and band #2 and products 2-1 HN and 2-2 HN refer to results for honey bar processing at 325° F.; and air and band #3 and products 3-1 HN and 3-2 HN refer to results for honey nut bar processing at 400° F. The graph in FIG. 4 indicates that changing the set point affected the oven temperature profile. As temperature was raised, the peak temperature and breadth of the air temperature profile was moved toward the front of the oven. In addition, the band heated to a higher peak, then began to cool. From these curves it was surmised that that the biggest impact of raising the set point was on the band. It is also important to note that heat-set processing step is effective at a wide range of cereal bar product temperatures, such as bar product central temperatures ranging from approximately 150 to approximately 290° F. Referring to FIG. 4, the experimental data on the honey nut formulations shows the centerline (central) bar temperature reaching about 150° F. when the first zone air temperatures were set at 250 and 325° F. In the other run using an air set point temperature of 400° F. for the honey nut formula, the bar centerline temperature reached about 200° F. In these cases the actual air oven temperature ranged from about 230 to 280° F.

Example 4

Cereal bars having a modified honey nut formula as described in Table 3 below were prepared and were heat-set at an oven setting of 400° F. in a two-zone indirect fired oven under similar conditions as described for the honey nut formula in Example 3. The modified cereal bar formulation of this illustration included caramel and compound coating in the binder mixture. All non-cereal ingredients (dries) were added via the binder mixture. The cereal pieces and total binder were used in a ratio of about 1:1, respectively.

TABLE 3

| Modified Honey Nut Cereal Ingredients | Percent |
|---|---|
| Wheat Flakes | 15.0 |
| Toasted Oats | 15.0 |
| Crisp Rice | 4.0 |
| Granola | 2.0 |
| Corn Flakes | 7.9 |
| Almonds | 3.0 |
| Calcium Carbonate | 0.8 |
| Vitamins | 0.1 |
| Binder Mixture Ingredients | |
| High Maltose Corn Syrup | 20.0 |
| Compound coating | 9.0 |
| Polydextrose | 5.8 |
| caramel | 8.0 |
| Glycerin, 99.7% | 4.0 |
| Vegetable oil | 1.6 |
| Honey | 2.0 |
| Citric Acid | 0.1 |
| Salt | 0.2 |
| Soy Lecithin | 0.2 |
| Water | 0.8 |
| Flavor | 0.5 |

The modified honey nut formulations had similar surface and central water activity values before and after heat processing as observed for the honey nut formulation products of Table 2.

While the invention has been particularly described with specific reference to particular process and product embodiments, it will be appreciated that various alterations, modifications and adaptations may be based on the present disclosure, and are intended to be within the spirit and scope of the present invention as defined by the following claims.

What is claimed is:

1. A method for making cereal bars, comprising:
   forming a cereal matrix comprising cereal pieces and an edible binder in a wt:wt ratio of about 2:1 to about 1:2, respectively, into a cereal matrix layer by application of a compressive pressure force that does not exceed about 50 psi to form the cereal matrix layer having intact cereal pieces and to achieve a density of about 0.05 g/cc to about 0.5 g/cc and a thickness of about 0.5 cm to about 5 cm with an exposed external portion and an internal central portion, wherein the exposed external portion and the internal central portion each has an initial water activity exceeding about 0.35;
   heating the cereal matrix layer for a time and temperature in an indirect fired oven having a heated zone and a subsequent non-heated zone wherein the cereal matrix layer dwells in each of the heated zone and the subsequent non-heated zone for at least about 2.5 minutes effective so that the water activity is less than about 0.3 in the exposed external portion of the cereal matrix layer, while maintaining the internal central portion of the cereal matrix layer at a water activity greater than about 0.40, to provide a heated layer;
   cooling the heated layer to provide a cooled layer; and
   cutting the cooled layer, or alternatively the cereal matrix layer prior to the heating step, effective to form discrete cereal bars.

2. The method of claim 1, wherein the initial water activity of the cereal matrix layer is from about 0.50 to about 0.60, and a final water activity of the layer is about 0.40 to about 0.55 after the cooled layer is allowed to equilibrate for up to about 3 months at ambient temperature conditions.

3. The method of claim 1, wherein the heating of the cereal matrix layer is conducted at a temperature of about 200 degrees F. to about 450 degrees F., as measured in oven air space at a location approximately one inch from the external portion of the layer, for a time of about 1 to about 20 minutes.

4. The method of claim 1, wherein the forming shapes the cereal matrix layer into a preselected cross-sectional bar shape.

5. The method of claim 1, wherein the cutting is performed on the cooled layer.

6. The method of claim 1, wherein the forming comprises sheeting.

7. The method of claim 1, wherein the forming comprises extruding the cereal matrix in generally rectangular cross-sectional shape.

8. The method of claim 1, wherein the binder is heated to a temperature of about 120 degrees F. to about 230 degrees F. before the mixing with the cereal pieces.

9. The method of claim 1, wherein the binder comprises a carbohydrate syrup composition.

10. The method of claim 1, wherein the cereal bar contains 0 to 10 wt % sugar alcohols.

11. The method of claim 1, wherein the cereal matrix contains cereal pieces and the edible binder in a wt:wt ratio of about 1.5:0.5 to about 0.5:1.5, respectively.

12. The method of claim 1, wherein the cereal bar further includes 0.1 to about 10 wt % dairy solids.

13. The method of claim 1, wherein the cereal pieces are selected from the group consisting of rolled cereals, puffed grains, toasted flakes, extruded pieces and mixtures thereof.

14. The method of claim 13, wherein the cereal pieces comprise a combination of at least two different types thereof.

15. The method of claim 1, wherein the cereal bar comprises a sweet bar.

16. The method of claim 1, wherein the cereal bar comprises a savory bar.

17. A method for making cereal bars, comprising:
    sheeting a cereal matrix comprising cereal pieces and carbohydrate syrup in a wt:wt ratio of about 1.5:0.5 to about 0.5:1.5, respectively, to provide a cereal matrix layer by application of a compressive pressure force that does not exceed about 50 psi to achieve a density of about 0.05 g/cc to about 0.5 g/cc at a thickness of about 0.5 cm to about 5 cm with an exposed external portion and an internal central portion covered by the exposed external portion, wherein the exposed external portion and internal central portion each has an initial water activity exceeding about 0.35;
    heating the cereal matrix layer for a time and temperature in an indirect fired oven comprising a heated zone and a subsequent non-heated zone wherein the cereal matrix layer dwells in each of the heated zone and the subsequent non-heated zone for at least about 2.5 minutes effective so that the water activity is less than about 0.3 in the exposed external portion of the cereal matrix layer, while maintaining the internal central portion of the cereal matrix layer at a water activity greater than 0.35, to provide a heated layer;
    cooling the heated layer by exposing the heated layer to chilled air effective to immobilize the binder to provide a cooled layer; and
    cutting the cooled layer effective to form discrete cereal bars.

18. The method of claim 1, wherein a temperature of the internal central portion is limited to about 150° F. to about 290° F. during the heating step.

19. The method of claim 17, wherein a temperature of the internal central portion is limited to about 150° F. to about 290° F. during the heating step.

* * * * *